(12) United States Patent
Fujimoto

(10) Patent No.: US 6,277,044 B1
(45) Date of Patent: Aug. 21, 2001

(54) FRONT DERAILLEUR WITH PROTECTIVE PLATE AND CONNECTING BAND

(75) Inventor: Tadao Fujimoto, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/082,439

(22) Filed: May 20, 1998

(51) Int. Cl.[7] .................................................. F16H 59/00
(52) U.S. Cl. .................................................. 474/80; 474/82
(58) Field of Search .................................. 474/78, 79, 80, 474/81, 82, 123; 280/236, 237, 238

(56) References Cited

U.S. PATENT DOCUMENTS

| | | | |
|---|---|---|---|
| 4,279,605 | * | 7/1981 | Egami ..................................... 474/82 |
| 4,330,137 | * | 5/1982 | Nagano ................................. 280/238 |
| 4,424,048 | * | 1/1984 | Shimano ................................ 474/82 |
| 4,460,347 | * | 7/1984 | Bergles .............................. 474/80 X |
| 5,496,222 | * | 3/1996 | Kojima et al. .......................... 474/80 |
| 5,607,367 | * | 3/1997 | Patterson ............................... 474/80 |
| 5,728,018 | * | 3/1998 | Terada et al. ............................ 474/80 |
| 5,846,148 | * | 12/1998 | Fujii ....................................... 474/80 |

FOREIGN PATENT DOCUMENTS 54-77358    11/1977    (JP).

OTHER PUBLICATIONS

'96 Shimano Bicycle System Components Dealer Sales & Support Manual, p. 15, published prior to the filing date of this application.

* cited by examiner

Primary Examiner—David A. Bucci
Assistant Examiner—Marcus Charles
(74) Attorney, Agent, or Firm—James A. Deland

(57) ABSTRACT

A protective plate for attachment to a bicycle frame for guiding a chain includes a support body having a first side for facing laterally toward the bicycle frame, a second side for facing laterally away from the bicycle frame, a lower portion, and an upper portion. The lower portion of the first side of the support body is structured to align with a bottom bracket of the bicycle, and a frame attachment member is disposed on the upper portion of the support body for clamping the upper portion of the support body to the bicycle frame. A chain guiding abutment may be formed on the upper portion of the second side of the support body for guiding the chain as the chain shifts from a larger chainring to a smaller chainring.

28 Claims, 4 Drawing Sheets

the other hand, it is undesirable to make the plate thicker because that would undesirably increase the weight of the plate.

FRONT DERAILLEUR WITH PROTECTIVE PLATE AND CONNECTING BAND

BACKGROUND OF THE INVENTION

The present invention is directed to a protective plate for a bicycle chain and, more particularly, to a protective plate that is mounted near the front derailleur of the bicycle to prevent the chain from falling from the large sprocket and which is capable of securely positioning the front derailleur on the frame.

Some bicycles are equipped with three front chainrings connected to the front pedals and a plurality of rear sprockets attached to the rear wheel of the bicycle. A chain is connected between a selected front chainring and a selected rear sprocket to provide driving force from the pedals to the rear wheel. A front derailleur is used to position the chain on the selected front chainring, and a rear derailleur is used to position the chain on the selected rear sprocket. The various combinations of front and rear sprockets provide a wide range of gear ratios to accommodate a wide range of riding conditions.

If the front derailleur is not adjusted properly, there is a risk that the chain will fall from the smallest chainring when the chain is being shifted from the middle chainring to the smallest chainring. As a result, the chain often jams between the smallest sprocket and the bicycle frame, thus requiring the rider to dismount the bicycle and reattach the chain to the sprocket. Since the chain often jams between the smallest sprocket and the bicycle frame with much force, unjamming the chain can be very difficult. Thus, it is desirable to prevent such jamming if possible.

Finally, adjusting the front derailleur includes properly setting the vertical position of the front derailleur on the seat tube. This can prove very difficult and time consuming, since very close tolerances are usually required for proper operation.

One apparatus used with a front derailleur for preventing chain derailing while facilitating the positioning of the front derailleur on the bicycle is disclosed in U.S. patent application Ser. No. 09/023,821 entitled "Protective Plate for a Bicycle Chain" filed Feb. 13, 1998. That patent application discloses a protective plate for attachment to a bicycle frame, wherein the protective plate includes a support body having a first side for facing laterally toward the bicycle frame, a second side for facing laterally away from the bicycle frame, a lower portion, and an upper portion. The lower portion of the first side of the support body is structured to align with a bottom bracket of the bicycle, and a positioning abutment member is disposed on the upper portion of the first side of the support body. An upper surface of the positioning abutment member forms a positioning abutment for positioning a front derailleur to the bicycle frame. Additionally, a chain guiding abutment may be formed on the upper portion of the second side of the support body for guiding the chain as the chain shifts from a larger chainring to a smaller chainring. In this apparatus, the upper portion of the support body is not securely fixed to the bicycle frame, so some flexure of the support body can occur during very rough riding, thus decreasing the effectiveness of the front derailleur.

The assignee of the present invention also has sold a model FD-M950 front derailleur with a support plate that mounts directly to the bottom bracket. That derailleur is prior art to this invention. To save weight, this support plate is formed relatively thin. However, such a thin plate may flex and alter the optimal positioning of the derailleur. On the other hand, it is undesirable to make the plate thicker because that would undesirably increase the weight of the plate.

SUMMARY OF THE INVENTION

The present invention is directed to a protective plate which mounts to a bicycle frame between the large chainring and the bicycle frame for securely positioning the front derailleur on the bicycle frame and for guiding the chain as the chain shifts from a larger sprocket to a smaller sprocket so that the chain does not fall from the smaller sprocket.

In one embodiment of the present invention, the protective plate includes a support body having a first side for facing laterally toward the bicycle frame, a second side for facing laterally away from the bicycle frame, a lower portion, and an upper portion. The lower portion of the first side of the support body is structured to align with a bottom bracket of the bicycle, and a frame attachment member is disposed on the upper portion of the support body for clamping the upper portion of the support body to the bicycle frame. The frame attachment member prevents rotation of the derailleur around the bottom bracket and increases the rigidity of the upper portion of the protective plate. A chain guiding abutment may be formed on the upper portion of the second side of the support body for guiding the chain as the chain shifts from a larger chainring to a smaller chainring.

In a more specific embodiment, the frame attachment member may support the front derailleur or be integrally formed therewith for securely attaching the front derailleur to the bicycle frame. The chain guiding abutment has an arcuate shape and is disposed at an angle of from approximately 45° to approximately 85°, and more specifically approximately 66°, from a horizontal axis.

DETAILED DESCRIPTION OF THE EMBODIMENTS

Figure 1:
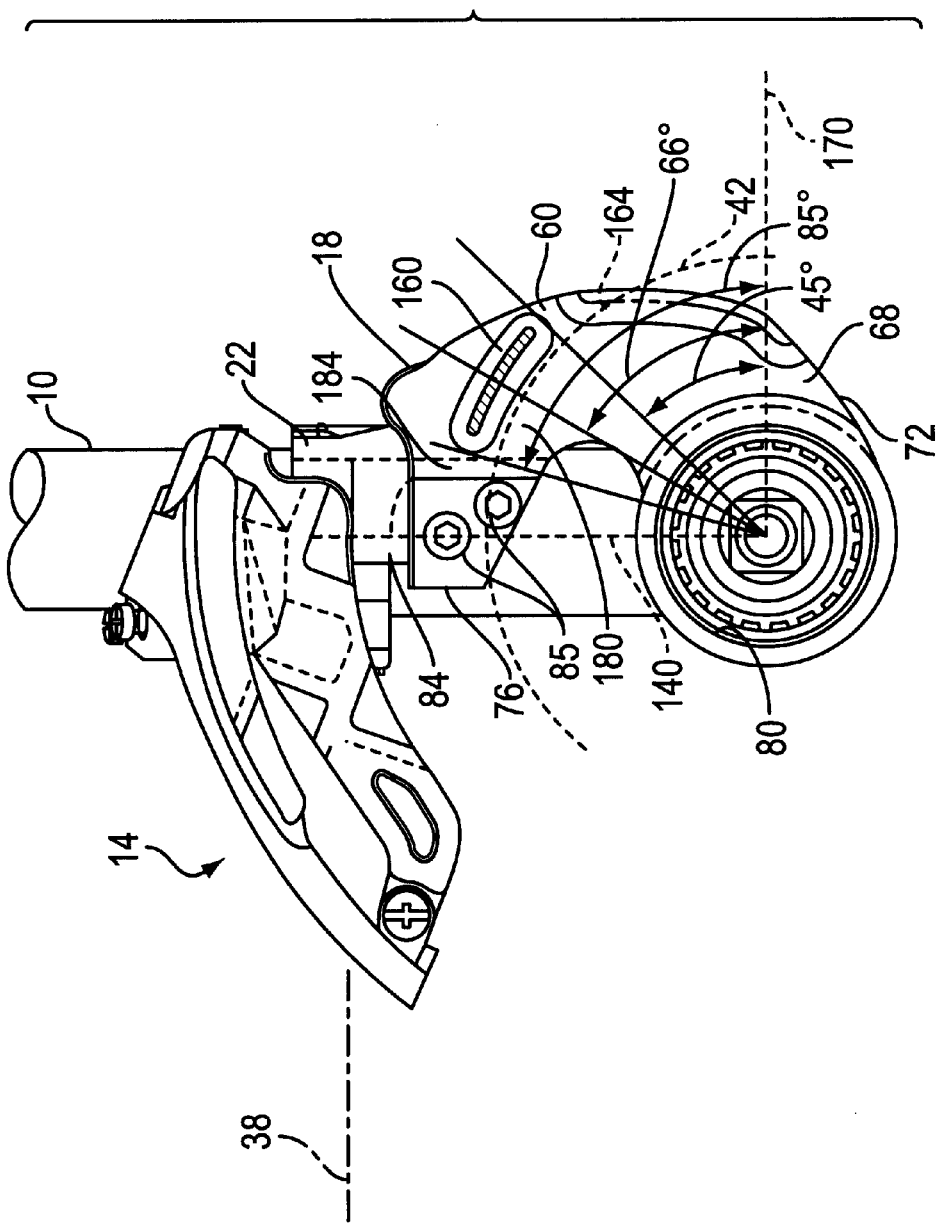
FIG. 1 side view of a portion of a bicycle frame on which is mounted a front derailleur and a particular embodiment of a protective plate according to the present invention.
Figure 2:
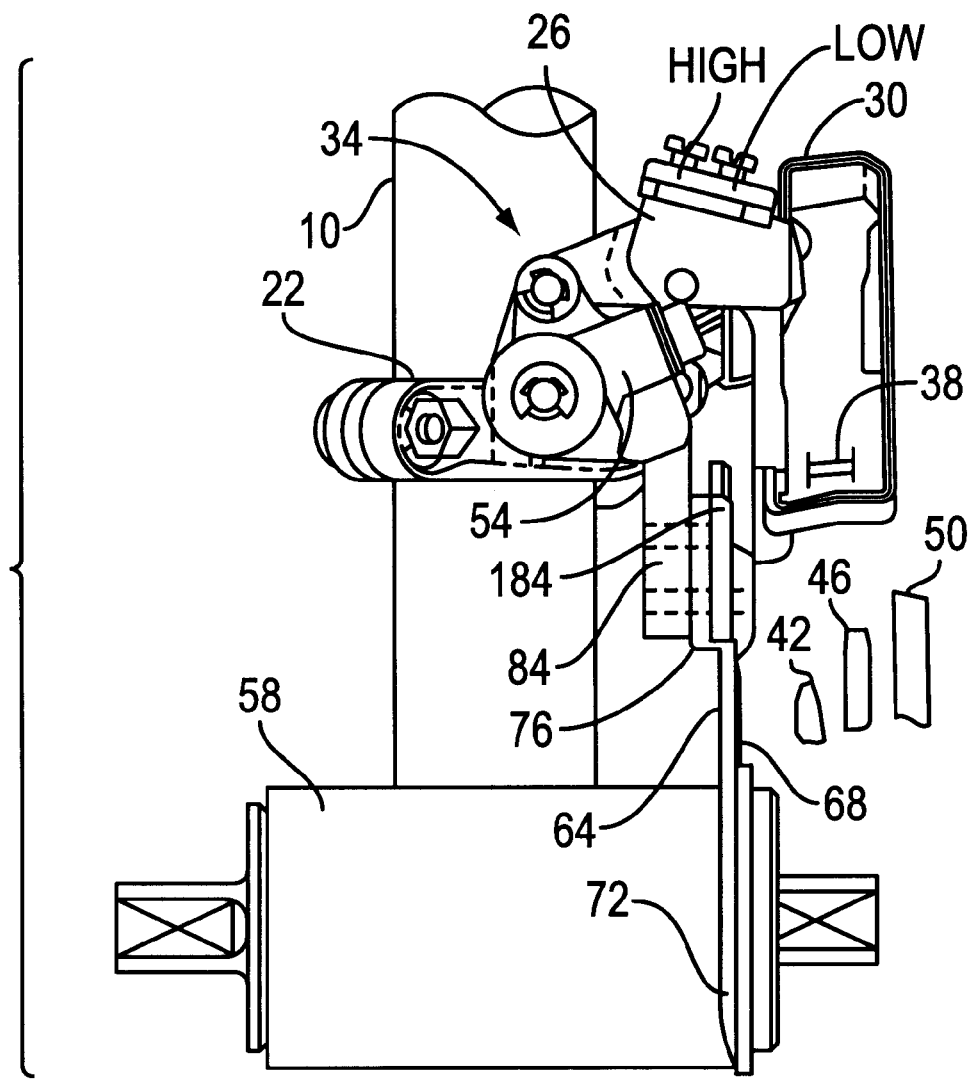
FIG. 2 is a rear view of the bicycle frame, front derailleur and protective plate shown in FIG. 1.
Figure 3:
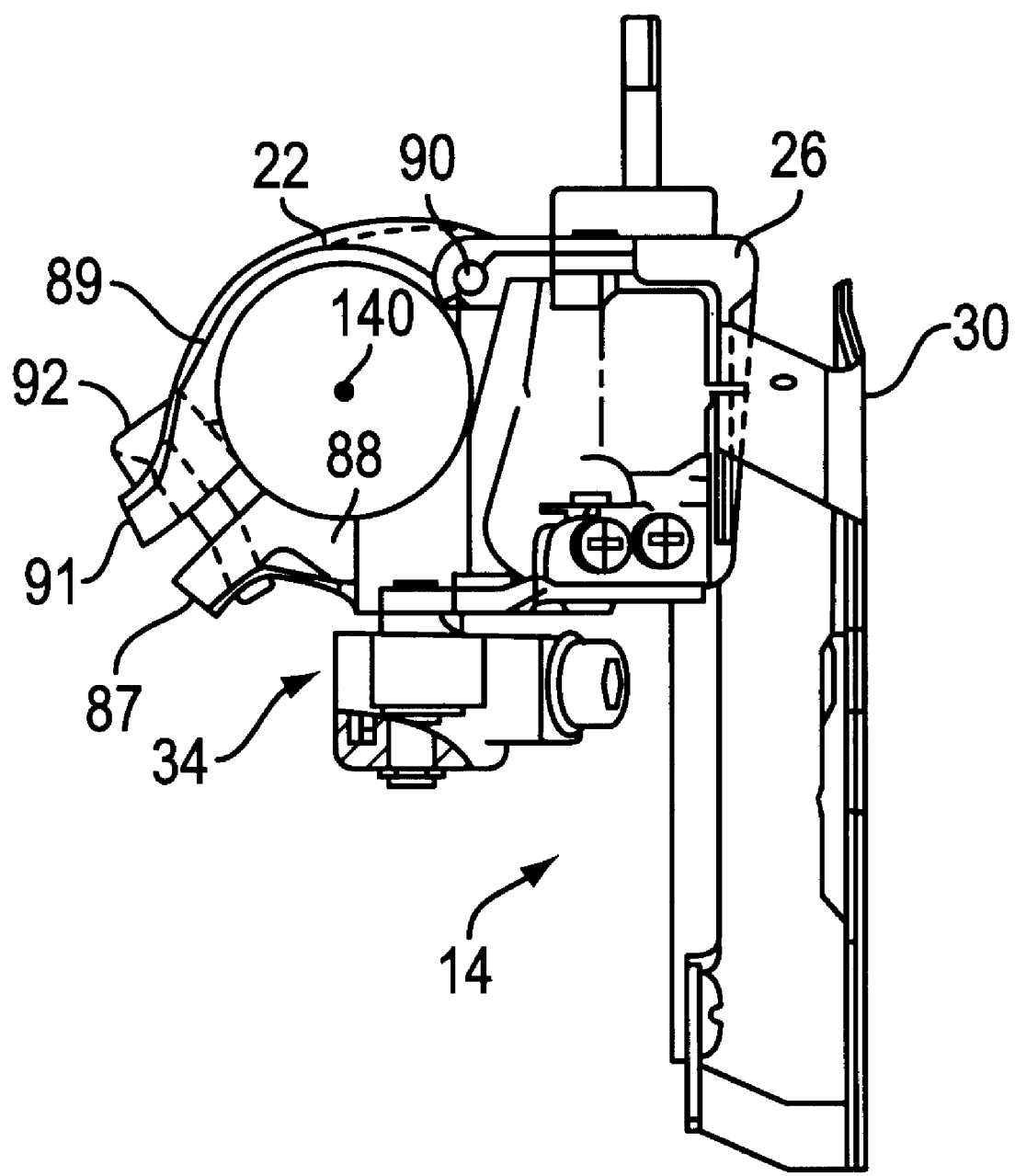
FIG. 3 is a top view of the protective plate and derailleur shown in FIGS. 1 and 2.

FIG. 1 is a side view of a portion of a seat tube of a bicycle frame 10 on which is mounted a front derailleur 14 and a particular embodiment of a protective plate 18 according to the present invention, FIG. 2 is a rear view of the bicycle frame 10, front derailleur 14 and protective plate 18 shown in FIG. 1, and FIG. 3 is a top view of front derailleur 14 and protective plate 18. Front derailleur 14 includes a base member 22 for mounting front derailleur 14 to bicycle frame 10, a movable member 26 supporting a chain guide 30, and a linkage mechanism 34 for coupling movable member 26 to base member 22 so that chain guide 30 can guide a chain 38 among a small chainring 42, a middle chainring 46 and a large chainring 50 in response to tension applied by a derailleur cable (not shown) to an actuating arm 54 in a known manner.

If front derailleur 14 is not adjusted properly, there is a risk that chain 38 may fall from small sprocket 42 when front derailleur 14 shifts chain 38 from middle sprocket 46 to small sprocket 42. When this happens, sometimes chain 38 usually jams between small sprocket 42 and frame 10, particularly between small sprocket 42 and a bottom bracket 58. To prevent this from happening, protective plate 18 is mounted to frame 10 between small sprocket 42 and frame 10, and more specifically between small sprocket 42 and bottom bracket 58.

Protective plate 18 includes a support body in the form of a plate body 60 having a first side 64 for facing laterally toward the bicycle frame 10, a second side 68 for facing laterally away from the bicycle frame, a lower portion 72 and an upper portion 76. Support body 60 may be formed from plastic, fiberglass, aluminum, steel, etc.. As used herein, the terms "laterally toward the bicycle," "laterally away from the bicycle," "upper," and "lower" are to be determined from FIG. 2, and the terms "forward," "front," "rear," and "back" are to be determined from FIG. 1 where the forward or front direction is toward the right in FIG. 1, and the rear or back direction is toward the left in FIG. 1.

The lower portion 72 of the support body 60 has a bottom bracket opening 80 that aligns with bottom bracket 58. In this embodiment, bottom bracket opening 80 has substantially the same diameter as the corresponding opening (not shown) in bottom bracket 58 of the bicycle. In any event, the first side 64 of the lower portion 72 of support body 60 aligns with bottom bracket 58 when protective plate 18 is mounted to bicycle frame 10.

A frame attachment member 84 is disposed on the upper portion 76 of the first side 64 of support body 60 for attaching support body 60 on bicycle frame 10. In this embodiment, frame attachment member 84 is formed as one piece with base member 22 and extends laterally inwardly at an approximate right angle to first side 64. Frame attachment member 84 is detachably fastened to upper portion 76 of support body 60 through screws 85. Thus, the same support body may be used with different derailleurs.

As shown more clearly in FIG. 3, frame attachment member 84 includes a stationary frame attachment portion 88 and a pivoting frame attachment portion 89. Stationary frame attachment portion 88 has a fastening flange 87 and an arcuate inner peripheral surface for conforming to the shape of frame 10. Pivoting frame attachment portion 89 is pivotably connected to stationary frame attachment portion 88 through a pivot pin 90. Pivoting frame attachment portion 89 also has a fastening flange 91 and an arcuate inner peripheral surface for conforming to the shape of frame 10. A fastener 92 extends through an opening in fastening flange 91 and screws into a threaded opening in fastening flange 87 for clamping frame attachment member 84 to frame 10 so that the upper portion 76 of support body 60 and front derailleur 14 are securely fastened to frame 10. As a result, derailleur 14 operates optimally even under rough and severe riding conditions.

A chain guiding abutment 160 is formed as one piece on the upper portion 76 of the second surface 68 of support body 60 for guiding the chain 38 to small sprocket 42 and preventing chain 38 from falling off small sprocket 42 when chain 38 is being shifted from middle sprocket 46 to small sprocket 42. As shown in FIG. 1, chain guiding abutment 160 is positioned above the circle 164 defined by the teeth of small sprocket 42 and has an arcuate shape centered on the center of bottom bracket opening 80. In this embodiment, the radial position of chain guiding abutment 160 is approximately 6.0 millimeters and preferably 6.4 millimeters from circle 164. Also, the laterally outermost edge 168 of abutment 160 extends from approximately 45° to approximately 85° counterclockwise from a horizontal axis 170 that is perpendicular to a vertical axis 140 that is centered relative to the arcuate inner peripheral surface of stationary frame attachment portion 88 and intersects the center of bottom bracket opening 80. Chain guiding abutment 160 preferably has a portion disposed at least at approximately 66° counterclockwise from horizontal axis 170.

A lower recess 180 is formed on the second side 68 of support body 60 beneath chain guide abutment 160 and approximately follows the path of the teeth of small sprocket 42 as shown in FIG. 1. Lower recess 180 helps to prevent chain 38 from rubbing against support body 60 when chain 38 meshes with small sprocket 42. Additionally, a rear recess 184 is disposed adjacent to and in back of chain guiding abutment 160 for preventing chain 38 from rubbing against support body 60 when chain 38 meshes with small sprocket 42 and the largest sprocket on the rear wheel of the bicycle. In this embodiment, rear recess 184 has a stepped or tapered shape which tapers laterally inwardly from the rear of chain guiding abutment 160 to the rear edge of support body 60 as shown more clearly in FIG. 2.

Figure 4:
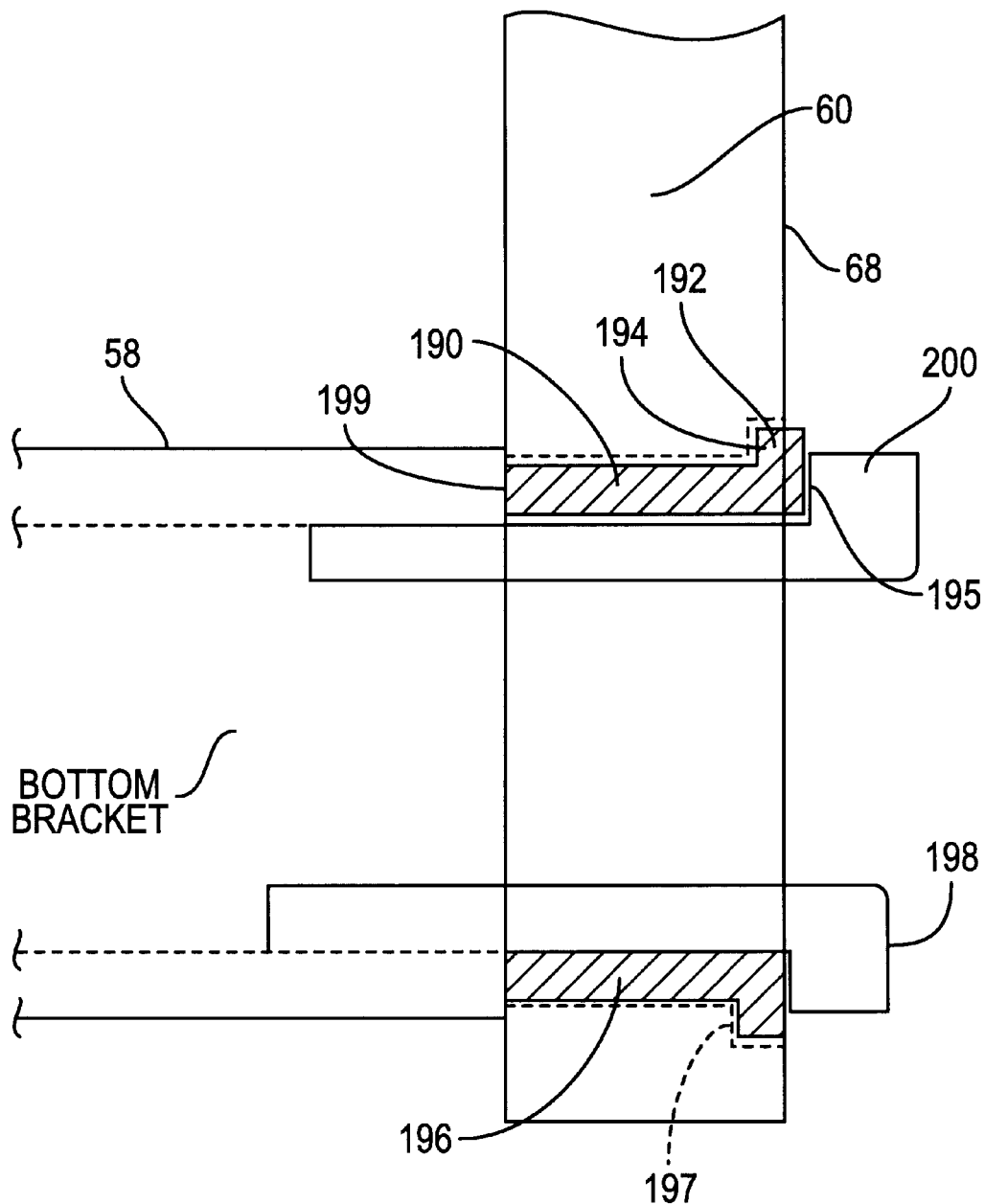
FIG. 4 is a cross sectional diagram showing how the protective plate is fastened to the bottom bracket of the bicycle.

To use protective plate 18, support body 60 is placed so that frame attachment member 84 surrounds frame 10 and the first surface 64 of support body 60 abuts against bottom bracket 58 with bottom bracket opening 80 aligned with the opening in bottom bracket 58. As shown in FIG. 4, a fastening ring 190 having a flange 192 with a knurled lateral inside surface 194, a lateral outside surface 195 and a cylindrical portion 196 is fitted to support body 60 so that cylindrical portion 196 extends through bottom bracket opening 80 and lateral inside surface 194 is lightly fitted within a groove 197 in second surface 68. A conventional bottom bracket bearing mounting cup 198 having a flange 200 is then screwed into the opening of bottom bracket 58 to retain support body 60 to frame 10. An inner edge 199 of cylindrical portion 196 of fastening ring 190 abuts against the edge of bottom bracket 58 so that flange 200 does not apply excessive pressure to support body 60. However, support body 60 is fixed between fastening ring 190 and bottom bracket 58 without play due to knurled surface 194. Thereafter, fastener 92 is screwed into fastening flanges 89 and 91 for tightly and securely fixing frame attachment member 84 to frame 10. When the chain 38 is shifted from middle sprocket 46 to small sprocket 42, chain guiding abutment 160 prevents chain 38 from falling off small sprocket 42.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Bottom bracket opening 80 may have a diameter smaller or larger than the opening in bottom bracket 58 as desired. Frame attachment member 88 need not be formed as one piece with base member 22, or else the entire frame attachment member and base member 22 may be formed as one piece with support body 60. Chain guiding abutment 160 need not be formed as one piece with support body 60. The knurled surface 194 on fastening ring 190 may instead be formed on the lower portion 72 of support body 60 around bottom bracket opening 80. Vertically elongated oval slots may be formed in the protective plate at screws 85 so that the vertical height of the derailleur may be adjusted. Thus, the scope of the invention should not be limited by the specific structures disclosed. Instead, the true scope of the invention should be determined by the following claims.

What is claimed is:

1. A protective plate for attachment to a bicycle frame for guiding a chain comprising:
   a support body having:
      a first side for facing laterally toward the bicycle frame;
      a second side for facing laterally away from the bicycle frame;
      a lower portion; and
      an upper portion;
   wherein the lower portion of the first side of the support body is structured to align with a bottom bracket of the bicycle;
   wherein the lower portion of the support body defines a bottom bracket opening;
   a separate fastening ring for projecting through the bottom bracket opening, wherein the fastening ring is adapted to be sandwiched between the bottom bracket and a bottom bracket bearing mounting cup for retaining the support body to the bicycle frame;
   wherein an inner edge of the fastening ring is adapted to abut against an edge of the bottom bracket;
   a frame attachment member disposed on the upper portion of the support body for fastening the upper portion of the support body to the frame; and
   a linkage member extending from the frame attachment member for movably supporting a chain guide.

2. The protective plate according to claim 1 wherein the lower portion of the support body defines a bottom bracket opening.

3. The protective plate according to claim 1 wherein the frame attachment member includes a base member for a front derailleur.

4. The protective plate according to claim 1 wherein the frame attachment member comprises:
   a stationary frame attachment portion; and
   a pivoting frame attachment portion pivotably connected to the stationary frame attachment portion.

5. The protective plate according to claim 1 further comprising a chain guiding abutment formed on the upper portion of the second side of the support body for guiding the chain.

6. The protective plate according to claim 1 wherein the fastening ring includes a cylindrical portion and a flange extending radially outwardly from the cylindrical portion.

7. The protective plate according to claim 3 wherein the frame attachment member is formed as one piece with the base member.

8. The protective plate according to claim 3 wherein the frame attachment member has a concave surface for positioning the support body on the bicycle frame, wherein the concave surface is centered relative to a vertical axis.

9. The protective plate according to claim 4 wherein the stationary frame attachment portion includes a first fastening flange, and wherein the pivoting frame attachment portion includes a second fastening flange.

10. The protective plate according to claim 5 wherein the chain guiding abutment is formed as one piece with the support body.

11. The protective plate according to claim 5 wherein the frame attachment member has a concave surface for positioning the support body on the bicycle frame, wherein the concave surface is centered relative to a vertical axis, wherein the lower portion of the support body defines a bottom bracket opening, wherein the vertical axis extends through a center of the bottom bracket opening, and wherein the vertical axis is perpendicular to a horizontal axis that extends through the center of the bottom bracket opening.

12. The protective plate according to claim 8 wherein the concave surface has a semicircular shape.

13. The protective plate according to claim 9 further comprising a fastener for coupling the first fastening flange to the second fastening flange.

14. The protective plate according to claim 11 wherein the chain guiding abutment is disposed at an angle of from approximately 45° to approximately 85° counterclockwise from the horizontal axis.

15. The protective plate according to claim 11 wherein the chain guiding abutment extends from an angle of approximately 45° to an angle of approximately 85° counterclockwise from the horizontal axis.

16. The protective plate according to claim 14 wherein the chain guiding abutment is disposed at an angle of approximately 66° counterclockwise from the horizontal axis.

17. The protective plate according to claim 15 wherein the abutment extends only from an angle of approximately 45° to an angle of approximately 85° counterclockwise from the horizontal axis.

18. The protective plate according to claim 17 wherein the chain guiding abutment is formed as one piece with the support body.

19. The protective plate according to claim 18 wherein the frame attachment member includes a base member for a front derailleur.

20. The protective plate according to claim 19 wherein the frame attachment member has an arcuate shape.

21. The protective plate according to claim 19 wherein the second side of the support body defines a lower recess radially inwardly of the chain guiding abutment.

22. The protective plate according to claim 20 wherein the chain guiding abutment has an arcuate shape.

23. The protective plate according to claim 20 wherein the second side of the support body defines a rear recess adjacent the chain guiding abutment and extending in the counterclockwise direction, wherein the rear recess is offset laterally from the second side of the support body in a direction toward the first side of the support body and extends in a rearward direction from a rear of the chain guiding abutment through a rear edge of the support body.

24. The protective plate according to claim 23 wherein the rear recess has a tapered shape.

25. A protective plate for attachment to a bicycle frame for guiding a chain comprising:
   a support body having:
      a first side for facing laterally toward the bicycle frame;
      a second side for facing laterally away from the bicycle frame;
      a lower portion; and
      an upper portion;
   wherein the lower portion of the first side of the support body is structured to align with a bottom bracket of the bicycle;
   wherein the lower portion of the support body defines a bottom bracket opening;
   a separate fastening ring for projecting through the bottom bracket opening, wherein the fastening ring is adapted to be sandwiched between the bottom bracket and a bottom bracket bearing mounting cup for retaining the support body to the bicycle frame;
   wherein the fastening ring includes a cylindrical portion and a flange extending radially outwardly from the cylindrical portion;

a frame attachment member disposed on the upper portion of the support body for fastening the upper portion of the support body to the frame;

a linkage member extending from the frame attachment member for movably supporting a chain guide; and wherein the support body has a groove formed in the second side for fitting the flange of the fastening ring therein.

26. A protective plate for attachment to a bicycle frame for guiding a chain comprising:

a support body having:
 a first side for facing laterally toward the bicycle frame;
 a second side for facing laterally away from the bicycle frame;
 a lower portion; and
 an upper portion;

wherein the lower portion of the first side of the support body is structured to align with a bottom bracket of the bicycle;

wherein the lower portion of the support body defines a bottom bracket opening;

a separate fastening ring for projecting through the bottom bracket opening, wherein the fastening ring is adapted to be sandwiched between the bottom bracket and a bottom bracket bearing mounting cup for retaining the support body to the bicycle frame;

wherein the fastening ring includes a cylindrical portion and a flange extending radially outwardly from the cylindrical portion;

a frame attachment member disposed on the upper portion of the support body for fastening the upper portion of the support body to the frame;

a linkage member extending from the frame attachment member for movably supporting a chain guide; and wherein an inner edge of the cylindrical portion is adapted to abut against an edge of the bottom bracket.

27. A protective plate for attachment to a bicycle frame for guiding a chain comprising:

a support body having:
 a first side for facing laterally toward the bicycle frame;
 a second side for facing laterally away from the bicycle frame;
 a lower portion; and
 an upper portion;

wherein the lower portion of the first side of the support body is structured to align with a bottom bracket of the bicycle;

wherein the lower portion of the support body defines a bottom bracket opening;

a separate fastening ring for projecting through the bottom bracket opening, wherein the fastening ring is adapted to be sandwiched between the bottom bracket and a bottom bracket bearing mounting cup for retaining the support body to the bicycle frame;

wherein the fastening ring includes a cylindrical portion and a flange extending radially outwardly from the cylindrical portion;

a frame attachment member disposed on the upper portion of the support body for fastening the upper portion of the support body to the frame;

a linkage member extending from the frame attachment member for movably supporting a chain guide; and wherein the flange of the fastening ring has a knurled lateral inside surface.

28. A protective plate for attachment to a bicycle frame for guiding a chain comprising:

a support body having:
 a first side for facing laterally toward the bicycle frame;
 a second side for facing laterally away from the bicycle frame;
 a lower portion; and
 an upper portion;

wherein the lower portion of the first side of the support body is structured to align with a bottom bracket of the bicycle;

wherein the lower portion of the support body defines a bottom bracket opening;

a separate fastening ring for projecting through the bottom bracket opening, wherein the fastening ring is adapted to be sandwiched between the bottom bracket and a bottom bracket bearing mounting cup for retaining the support body to the bicycle frame;

wherein the fastening ring includes a cylindrical portion and a flange extending radially outwardly from the cylindrical portion;

a frame attachment member disposed on the upper portion of the support body for fastening the upper portion of the support body to the frame;

a linkage member extending from the frame attachment member for movably supporting a chain guide;

wherein the support body has a groove formed in the second side for fitting the flange of the fastening ring therein, wherein an inner edge of the cylindrical portion is adapted to abut against an edge of the bottom bracket, and wherein the flange of the fastening ring has a knurled lateral inside surface.

* * * * *